(No Model.)
E. M. C. ANDERSON.
GREEN CORN CUTTER.
No. 287,080. Patented Oct. 23, 1883.
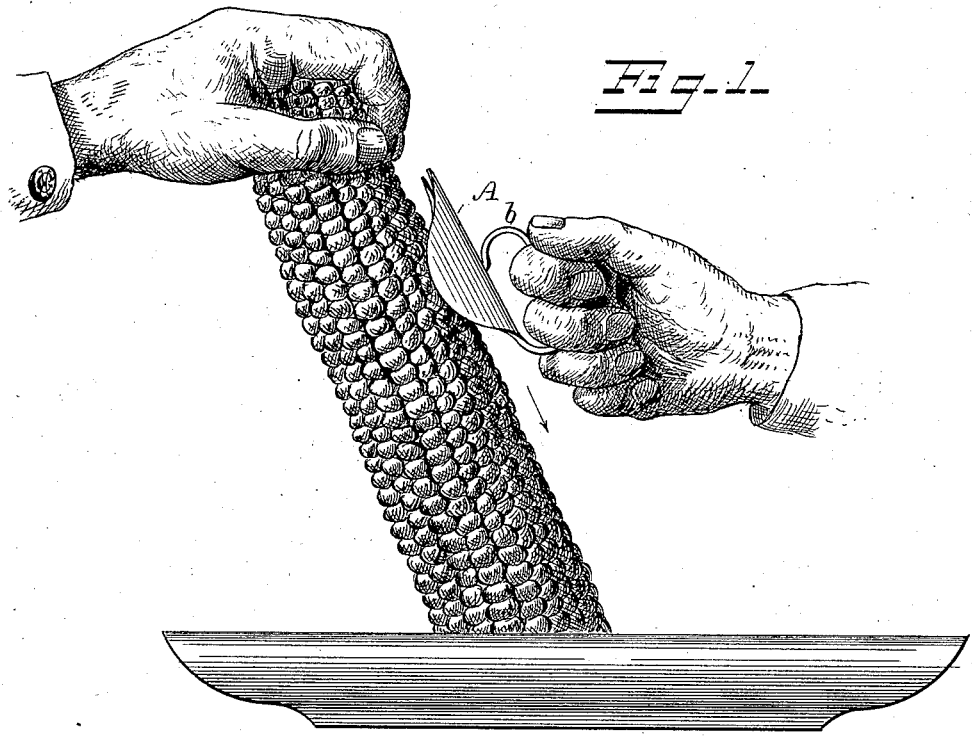
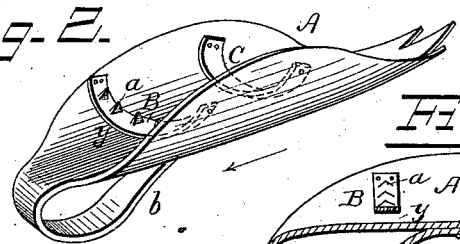
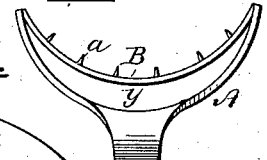
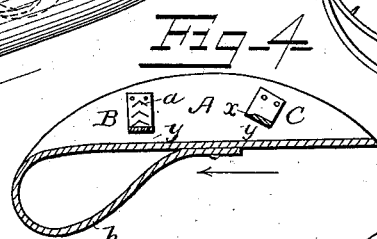
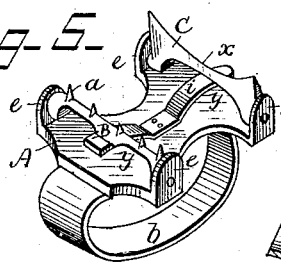
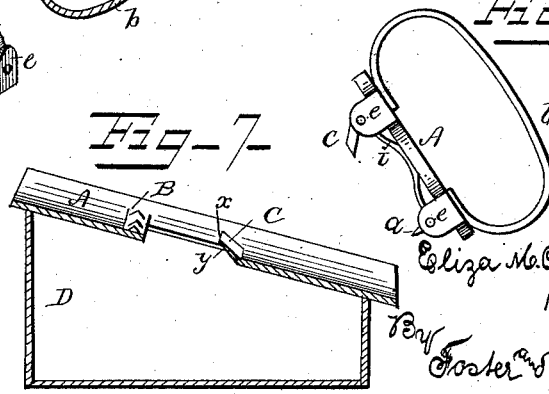
WITNESSES
Eliza McC. Anderson,
INVENTOR:
By Foster & Freeman,
Attorneys
N. PETERS, Photo-Lithographer, Washington, D. C.

UNITED STATES PATENT OFFICE.

ELIZA M. C. ANDERSON, OF NEW YORK, N. Y.

GREEN-CORN CUTTER.

SPECIFICATION forming part of Letters Patent No. 287,080, dated October 23, 1883.

Application filed July 11, 1883. (No model.)

*To all whom it may concern:*

Be it known that I, ELIZA M. C. ANDERSON, a citizen of the United States, and a resident of New York, county and State of New York, have invented certain new and useful Improvements in Maize-Graters, of which the following is a specification.

My invention is a corn-scraper adapted for table or kitchen use, and constructed, as fully described hereinafter, so as to readily remove the kernels of corn from the integuments when the corn is in a soft condition.

In the drawings, Figure 1 is a view illustrating my improved corn-scraper adapted for table use, and showing the manner in which the same is employed. Fig. 2 is an inverted perspective view of the device illustrated in Fig. 1. Fig. 3 is an end view of Fig. 2. Fig. 4 is a longitudinal section of Fig. 2. Fig. 5 is an inverted perspective view, showing a modification. Fig. 6 is a side view of Fig. 5. Fig. 7 is an elevation in section, showing the device as constructed for kitchen use.

The device consists, essentially, of a frame or plate, A, which is preferably curved longitudinally, and two bars, B C, the former carrying a series of knives or cutters, $a$, the points of which conform to a curved line approximating the curve of an ordinary-sized ear of corn, and the latter having a curved edge $x$, extending somewhat higher than the points of the teeth, and between each bar and the supporting plate or frame is an opening or channel, $y$, for the purpose hereinafter described.

The parts above described may be formed and arranged in various ways, according to the character of the device. For instance, when the device is intended for table use, an external handle, $b$, of any suitable construction, is connected to the plate A, and when it is intended for kitchen use the plate A is adapted for application in a stationary inverted position to a casing or receptacle, D, as shown in Fig. 7.

In the construction shown in Figs. 1 to 4 the plate A tapers toward each end, and may be formed and ornamented to represent externally the husks of an ear of corn, and the bars B C, curved to a less degree than the curve of the plate A, are set therein and secured in the manner shown in the drawings, the bar C being inclined, so that the edge $x$ will be uppermost.

As the device thus constructed is drawn along an ear of corn in the direction of the arrow, the teeth $a$ will slit the integuments of the grains, and the bar C, being brought with considerable pressure upon the slit grains, will force and scrape out the kernels, which will pass readily between the bars and the plate through the spaces $y$. By curving the bars or providing them with teeth set to corrrespond to a curve, and with a following curved edge, the device is caused to operate upon a series of rows at once, thereby greatly facilitating the operation, and by inclining the bar C its edge is caused to press upon the grains at the bases thereof, forcing the kernels outward, without unduly crushing them.

When the plate A is curved, the bars may be secured in fixed positions therein. When it is flat, however, the bars may be pivoted to ears $e$ at each side of the plate, as shown in Figs. 5 and 6, so that they may be turned down flat upon the plate, to prevent the points of the cutters and the scraping-edge from becoming dulled when the device is not in use. In such case a spring, $i$, may be set to bear upon the bars and hold them in their vertical positions, but so as to yield when the bars require to be turned down. Any other arrangement of spring or catch device suitable for this purpose may be employed.

When the device is used in an inverted position, as in Fig. 7, the space beneath the edge $x$ of the scraper-bar may constitute an opening, through which the kernels will fall into the receptacle below.

Any suitable holder or frame that will support the bars properly in position may be substituted for the plate A.

I am aware that a corn-cutter has been made consisting of a curved plate having a straight bar carrying a series of teeth, and another straight wire rod or bar, with recesses between both bars and the plate. The upper bar or rod was, however, below the plane of the points of the knives.

Without limiting myself to the exact construction shown, I claim—

1. A device for removing corn from cobs, consisting of a holder or plate, A, turned-back handle $b$, integral therewith, a cutter-bar provided with teeth arranged to conform to a curve, and a scraper-bar having a curved edge, $x$, extending above the points of the teeth, and recesses or channels $y$ between both bars and the plate, substantially as set forth.

2. The combination, with the holder or plate A, of a tooth-bar and a scraper, each pivoted to the plate, to be turned to vertical or horizontal positions, and a locking device for holding them when upright, substantially as set forth.

3. The combination of the curved plate A, the curved bars B C, and a handle applied to the plate A, the scraping-bar C consisting of a strip set at an angle to the plate, and having a curved edge, $x$, as set forth.

In testimony whereof I have signed my name to this specification in the presence of two subscribing witnesses.

ELIZA M. C. ANDERSON.

Witnesses:
ELIZA B. ANDERSON,
SOPHIE C. ANDERSON.